3,349,089
TRIAZINE DYES OF THE ANTHRAQUINONE SERIES
Mikhail Vasiljevich Kazankov, Moscow, and Valentin Nickolaevich Ufimtsev, Krasnogorsk, U.S.S.R., assignors to Gosudarstvenny Nauchno-Issledovateljsky Institute Organicheskikh Produktov i Krasitelei, Moscow, U.S.S.R.
No Drawing. Filed Dec. 24, 1964, Ser. No. 421,096
12 Claims. (Cl. 260—249)

This invention relates to new triazine dyestuffs of the anthraquinone series having the Formula 1

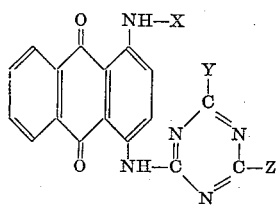

where X is an alkyl substituted phenyl radical, and Y and Z are similar or different radicals selected from the group consisting of aryl, phenoxy-, phenylamino-, anthraquinonylamino, 4-arylaminoanthra-quinonyl-1-amino, arthrapyridonylamino residues or their derivatives.

It has been found that the proposed dyes having the Formula 1 are suitable for mass coloration of synthetic fibers, polyester fibers in particular in deep blue, gray, olive, brown and green hues. These dyestuffs can also be used for the dyeing of plastics.

This invention also provides a process for the production of the new triazine dyestuffs of the anthraquinone series which comprises the condensation of one molecular proportion of cyanuric chloride or its derivative and 1–3 molecular proportions of 1-amino-4-arylaminoanthraquinone. If one or two moles of the latter are used, the remaining chloride atoms are substituted by a phenoxy-, or an arylamino group by condensing the product obtained at the previous step with phenolate of an alkaline metal or an aromatic amine, selected from the group consisting of aniline, toluidine, mesidine, 1-aminoanthraquinone, 1 - amino - 4 - arylaminoanthraquinone, and 4 - amino-N-methyl-1,9-anthrapyridone.

2,4-dichloro-6-aryl-1,3,5-triazine can also be used in the process as starting material.

In this case the dyes are produced by condensing said triazine with two moles of 1-amino-4-arylamino-anthraquinone.

Some of these dyestuffs can also be obtained in a single step by the introduction of the aromatic amine, phenolate of an alkaline metal, substituted or unsubstituted aminoanthraquinone or aminoanthrapyridone directly into the reaction mass without separation of the primary products of the condensation. If the process is carried out by steps, the succession of the substitution of chlorine atoms of cyanuric chloride by said residues can be changed.

The dyes of general Formula 1 are soluble in polyethylene terephthalate (lavsan). Incorporation of dyes into the resin melt does not affect adversely its spinability, nor does it adversely affect the physical or mechanical properties of the fiber obtained.

The dyes feature high thermal stability and withstand prolonged retention in molten resin at a temperature of 285° C.

The dyes are light fast and display good resistance to wet processing, sublimation and other tests.

*Example 1*

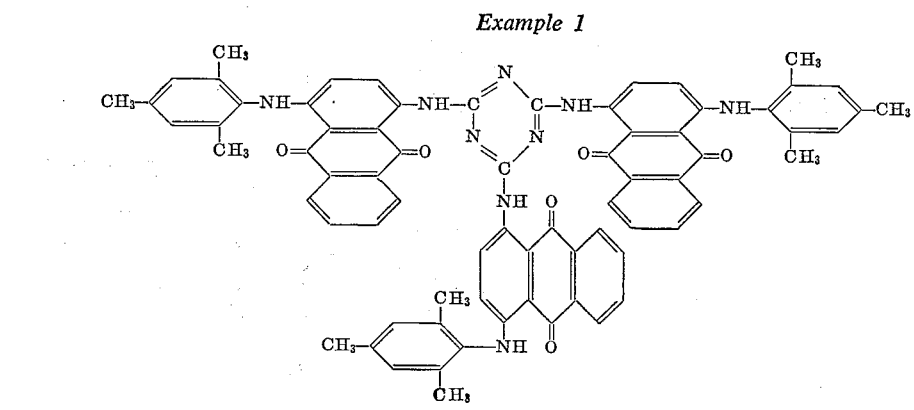

To 215 g. of molten phenol 15 g. of 1-amino-4-mesidino-anthraquinone and 2.6 g. of cyanuric chloride were added at a temperature of 100° C. The reaction mixture was stirred for five hours at 110° C., then heated and stirred for three hours at 150° C. The mixture was then cooled to 70° C., diluted with 300 ml. of methyl alcohol and stirred to complete cooling. The dye was separated by filtration, washed with methyl alcohol until a colorless filtrate was obtained, and dried.

The yield of 2,4,6-tri-(4'-mesidinoanthraquinonyl-1'-amino)-1,3,5-triazine was 13.25 g. or 80.5% by weight. The dye was purified by precipitation as the sulfate and recrystallization from aqueous dioxane. Melting point of the product was above 300° C.

*Analysis* (in percent)—Found: N, 10.93; 10.9. Calculated for $C_{72}H_{57}N_9O_6$: N, 11.02.

The dyestuff is used for mass coloration of lavsan in bright reddish-blue.

*Example 2*

By a process similar to that described in Example 1, 2,4,6-tri-(4'-para-toluidino) - anthraquinonyl - 1'-amino)-

1,3,5-triazine was obtained from 1-amino-4-(para-toluidino)-anthraquinone and cyanuric chloride.

The product is useful for mass coloration of lavsan in olive-green.

Example 4

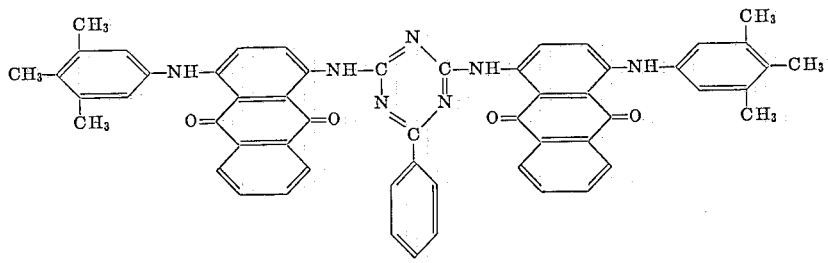

The product can be used for dyeing lavsan in greenish-blue.

Example 3

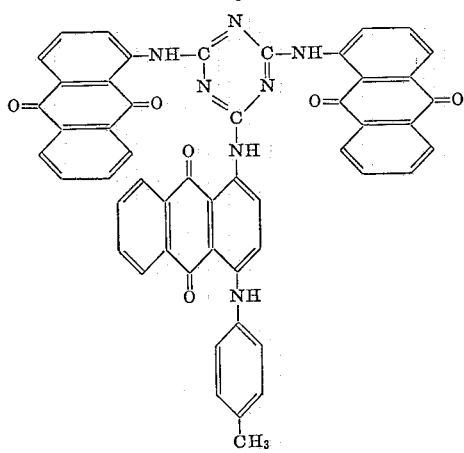

To 60 g. of phenol at temperature of 100° C. were added 3 g. of 2-chloro-4,6-di-(anthraquinoyl-1'-amino)-1,3,5-triazine (obtained by the condensation of one mole of cyanuric chloride with two moles of 1-aminoanthraquinone in nitrobenzene at a temperature of 190° C.) and 2 g. of 1-amino-4-(para-toluidino)-anthraquinone. The mixture was gradually heated and stirred for five hours at a temperature of 150° C. Then the reaction mixture was cooled to 70° C., diluted with 150 ml. of methyl alcohol, and cooled with stirring. The dye was separated by filtration, washed with methyl alcohol and dried. The yield of 2-(4'-(para-toluidino)-anthraquinonyl-1'-amino)-4,6-di-(anthraquinonyl-1''-amino)-1,3,5-triazine was 3.66 g. or 80% by weight. The melting point of the product recrystallized from diluted dioxane was above 300° C.

Analysis (in percent).—Found: C, 73.66; 73.41; H, 3.92; 3.87; N, 11.16; 11.30. Calculated for $C_{52}H_{31}N_7O_6$: C, 73.5; H, 3.65; N, 11.57.

To 300 g. of molten phenol at a temperature of 100° C. were added 15 g. of 1-amino-4-mesidinoanthraquinone and 4.76 of 2-phenyl-4,6-dichloro-1,3,5-triazine. The mixture was agitated at this temperature for five hours, then gradually heated to 150° C., stirred for three hours more at 150° C., cooled to 80° C. and diluted with 500 ml. of methyl alcohol. On cooling, the precipitate was separated by filtration, washed with methyl alcohol and dried. The yield of 2-phenyl-4,6-di-(4'-mesidinoanthraquinonyl-1'-amino)-1,3,5-triazine was 13.54 g. or 74.5% by weight. Melting point of the product after recrystallization from dioxane, was above 300° C.

Analysis (in percent).—Found: N, 11.17 and 10.88. Calculated for $C_{55}H_{43}N_7O_4$: N, 11.32.

The product can be used for mass coloration of lavsan in violet-blue.

Example 5

The product obtained from 1-amino-4-(para-toluidino)-anthraquinone and 2-phenyl-4,6-dichloro-1,3,5-triazine by a process similar to that described in Example 4, dyes lavsan in greenish-blue.

Example 6

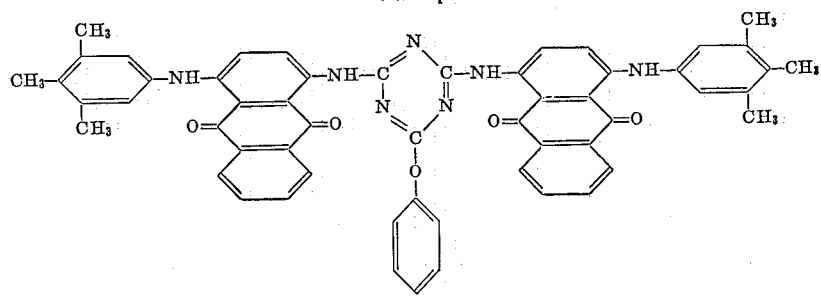

To 70 g. of molten phenol at 100° C. were added 3.8 g. of 2-chloro-4-di-(4'-mesidinoanthraquinonyl-1'-amino)-1,3,5-triazine (obtained by the condensation of one mole of cyanuric chloride with two moles of 1-amino-4-mesidinoanthraquinone in nitrobenzene at a temperature of 190° C.) and 3 g. of potassium phenolate; the mixture was heated gradually to 150° C. and stirred at this temperature for five hours. Then the mixture was cooled to 80° C. and diluted with 160 ml. of methyl alcohol. Upon cooling, the dye was separated by filtration, washed with methyl alcohol, and dried. The yield of 2-phenoxy-4,6-di-(4'-mesidinoanthraquinonyl-1'-amino)-1,3,5-triazine was 3.4 g. or 83.5% by weight. Melting point of the product recrystallized from a mixture of butyl alcohol and chloroform was above 300° C.

Analysis (in percent).—Found: C, 75.52; H, 5.00; N, 11.50 and 11.43. Calculated for $C_{55}H_{43}N_7O_5$: C, 75.00; H, 4.92; N, 11.10.

Example 7

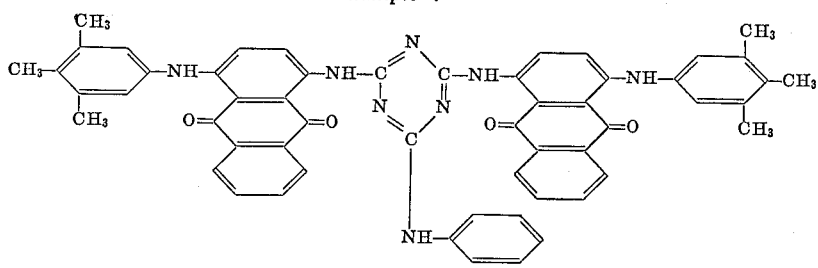

To 70 g. of molten phenol at a temperature of 100° C. were added 3.8 g. of 2-chloro-4,6-di(4'-mesidino-anthraquinonyl-1'-amino)-1,3,5-triazine, and 3 g. of aniline. The mixture was gradually heated to 150° C., stirred at this temperature for five hours, then cooled and diluted with 160 ml. of methyl alcohol. The dye was separated by filtration, washed with methyl alcohol and dried.

The yield of 2 - anilino - 4,6-di(4'-mesidinoanthraquinonyl-1'-amino)-1,3,5-triazine was 3.37 g. or 83% by weight. Melting point of the product after recrystallization from acetone was above 300° C.

*Analysis* (in percent).—Found: N, 12.48 and 12.38. Calculated for $C_{55}H_{44}N_8O_4$: N, 12.70.

The dyestuff can be used for mass coloration of lavsan in violet-blue.

Example 8

The dye obtained by a process similar to that described in Example 7 from 2-chloro-4,6-di-(4'-para-toluidino)-anthraquinonyl-1'-amino)-1,3,5-triazine and aniline, colors lavsan in greenish-blue.

Example 9

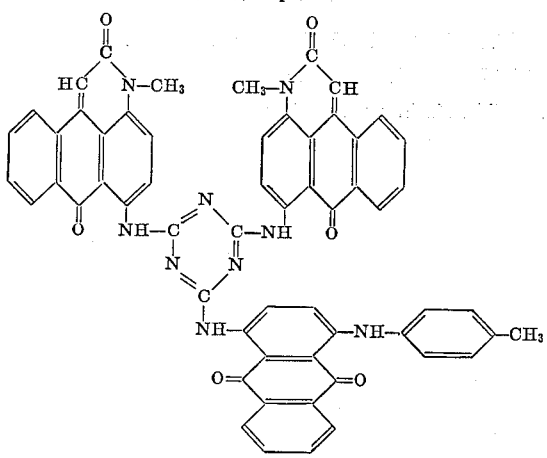

A mixture of 4 g. of 4-amino-N-methyl-1,9-anthrapyridone, 1.34 g. of cyanuric chloride and 35 ml. of nitrobenzene was heated to a temperature of 190° C. within one hour and stirred at this temperature for one hour; then the reaction mixture was cooled to 70° C., and 70 ml. of methyl alcohol was added. Upon cooling, the dye was separated by filtration, washed with methyl alcohol until the filtrate became colorless, and dried.

The yield of 2-chloro-4,6-di-(N'-methyl-1',9'-anthrapyridonyl-4'-amino)-1,3,5-triazine was 4.6 g., or 96% by weight.

To 25 g. of molten phenol at a temperature of 100° C. were added 1.5 g. of 2 chloro-4,6-di-(N'-methyl-1',9'-anthrapyridonyl-4'-amino)-1,3,5-triazine and 0.74 g. of 1-amino-4-(paratoluidino)-anthraquinone. The mixture was stirred for one hour at 110° C., then for four hours at a temperature of 150° C. and next cooled to 70° C.; 50 ml. of methyl alcohol was added, and the mixture was stirred to complete cooling. The mixture was filtered, washed with methyl alcohol until the filtrate became colorless, and dried.

The yield of 2-(4'-(para-toluidino)-anthraquinonyl-1'-amino) - 4,6 - di - (N" - methyl - 1",9" - anthrapyridonyl-4"-amino)-1,3,5-triazine was 1.84 g., or 85% by weight. Melting point was above 350° C.

The dyestuff is useful for mass coloration of lavsan in reddish-brown.

Example 10

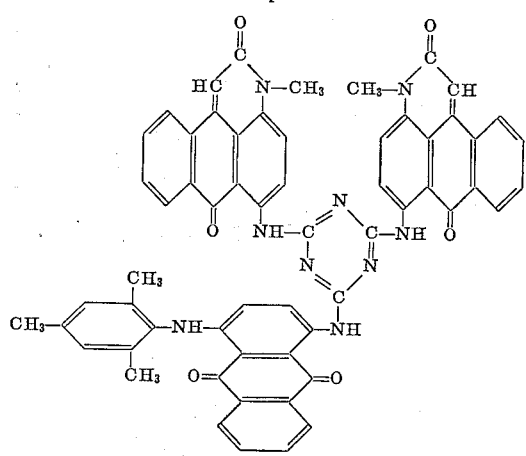

From 2 - chloro - 4,6 - di - (N' - methyl - 1',9' - anthrapyridonyl - 4' - amino) - 1,3,5 - triazine and 1 - amino-4-mesidinoanthraquinone by a procedure analogous to that described in Example 9, a dyestuff was obtained which can be used for mass coloration of lavsan in reddish-brown.

Example 11

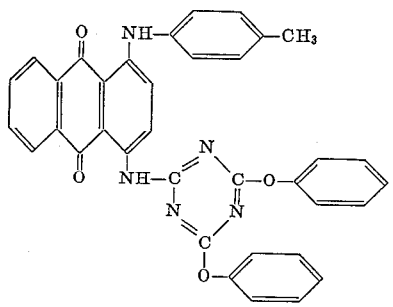

6 g. of 1 - amino - 4 - (para-toluidino) - anthraquinone was dissolved in 100 ml. of dioxane, cooled to 5° C., and at this temperature 3.4 g. of cyanuric chloride, dissolved in 60 ml. of acetone, was added dropwise. The mixture was stirred at 5° C. for 30 minutes, the pH being maintained at 6–7 by adding a saturated soda solution. The product was filtered and washed with water and acetone.

The yield of 2,4 - dichloro - 6 - (4' - (para-toluidino)-anthraquinonyl-1'-amino)-1,3,5-triazine was 5.76 g.

To 60 g. of molten phenol at a temperature of 100° C. were added 2.6 g. of 2,4-dichloro-6-(4'-(para-toluidino)-anthraquinonyl-1'-amino)-1,3,5-triazine and 2.2 g.

of potassium phenolate. The temperature was raised to 140–150° C., the mixture stirred at this temperature for five hours, cooled to 70° C., and then 120 ml. of methyl alcohol was added. The product was separated by filtration, washed with methyl alcohol until the filtrate became colorless, and dried.

The yield of 2,4-diphenoxy-6-(4'-(para-toluidino)-anthraquinonyl -1'-amino)-1,3,5-triazine was 2.85 g. This dyestuff can be used for mass coloration of lavsan in blue. The substitution of phenolate of an alkaline metal by aniline in a process similar to that described in this example gives 2,4 - dianilino - 6 - (4' - para-toluidino)-anthraquinonyl-1'-amino)-1,3,5-triazine. In the case of the substitution of phenolate of an alkaline metal by two molecular proportions of 1-amino-anthraquinone or 4-amino-N-methyl-anthrapyridone the dyestuffs described in Examples 3 and 9 are obtained.

*Example 12*

2-(4' - (para - toluidino) - anthraquinonyl - 1' - amino)-4,6 - di - (anthraquinonyl - 1" - amino) - 1,3,5 - triazine was obtained by the following procedure.

Five grams of 1-aminoanthraquinone was dissolved in 130 g. of molten phenol at 100° C., then 2.07 g. of cyanuric chloride was added, and the mixture was stirred for one hour at a temperature of 110° C. Then 3.68 g. of 1-amino-4-(para-toluidino)-anthraquinone was added, the temperature was raised to 150° C., and the mixture was stirred at this temperature for five hours, then cooled to 70° C., diluted with methyl alcohol (250 ml.); the product was filtered and washed with methyl alcohol until the filtrate became colorless.

The yield of olive dye was 8.52 g. or 90% by weight.

What we claim is:
1. A triazine dye of the formula

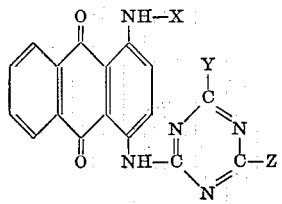

wherein X is an alkylsubstituted phenyl radical, and Y and Z are radicals selected from the group consisting of phenyl, phenoxy-, phenylamino-, anthraquinonylamino-, 4-arylaminoanthraqinonyl-1-amino, and anthrapyridonylamino residues.

2. 2,4,6 - tri - (4' - mesidinoanthraquinonyl - 1'-amino) - 1,3,5 - triazine.

3. 2,4,6 - tri - (4' - (para - toluidino) - anthraquinonyl-1' - amino) - 1,3,5 - triazine.

4. 2 - (4' - (para - toluidino) - anthraquinonyl - 1'-amino) - 4,6 - di - (anthraquinonyl - 1" - amino) - 1,3,5-triazine.

5. 2 - phenyl - 4,6 - di(4' - mesidinoanthraquinonyl-1' - amino) - 1,3,5 - triazine.

6. 2 - phenyl - 4,6 - di(4' - para - toluidino) - anthraquinonyl - 1' - amino) - 1,3,5 - triazine.

7. 2 - phenoxy - 4,6 - di(4' - mesidinoanthraquinonyl-1' - amino) - 1,3,5 - triazine.

8. 2 - anilino - 4,6 - di(4' - mesidinoanthraquinonyl-1' - amino) - 1,3,5 - triazine.

9. 2 - anilino - 4,6 - di(4' - (para - toluidino) anthraquinonyl - 1' - amino) - 1,3,5 - triazine.

10. 2,4 - diphenoxy - 6 - (4' - (para - toluidino)-anthraquinonyl - 1' - amino) - 1,3,5 - triazine.

11. 2 - (4' - (para - toluidino) - anthraquinonyl - 1'-amino) - 4,6 - di - (N" - methyl - 1",9" - anthrapyridonyl - 4" - amino) - 1,3,5 - triazine.

12. 2 - (4' - mesidinoanthraquinonyl - 1' - amino)-4,6 - di - (N" - methyl - 1",9" anthraquinonyl - 4"-amino) - 1,3,5 - triazine.

References Cited

UNITED STATES PATENTS

| | | | |
|---|---|---|---|
| 1,437,783 | 12/1922 | Steinbuch et al. | 260—249 |
| 1,523,308 | 1/1925 | Steinbuch et al. | 260—249 |
| 1,994,602 | 3/1935 | Weiners | 260—249 |

WALTER A. MODANCE, *Primary Examiner.*

N. S. MILESTONE, *Examiner.*

J. M. FORD, *Assistant Examiner.*